United States Patent
Wu

(10) Patent No.: US 8,855,633 B2
(45) Date of Patent: *Oct. 7, 2014

(54) METHOD OF HANDLING SYSTEM INFORMATION RECEPTION AND RELATED COMMUNICATION DEVICE

(71) Applicant: HTC Corporation, Taoyuan County (TW)

(72) Inventor: Chih-Hsiang Wu, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/851,934

(22) Filed: Mar. 27, 2013

(65) Prior Publication Data

US 2013/0231109 A1 Sep. 5, 2013

Related U.S. Application Data

(62) Division of application No. 12/730,244, filed on Mar. 24, 2010, now Pat. No. 8,463,260.

(60) Provisional application No. 61/165,524, filed on Apr. 1, 2009.

(51) Int. Cl.
*H04W 4/00* (2009.01)
*H04W 48/08* (2009.01)
*H04W 48/16* (2009.01)
*H04W 60/04* (2009.01)

(52) U.S. Cl.
CPC .............. *H04W 48/16* (2013.01); *H04W 60/04* (2013.01); *H04W 48/08* (2013.01)

USPC ........ 455/434; 455/432.1; 455/437; 455/438; 455/426.1

(58) Field of Classification Search
USPC ............. 455/432.1, 426.1, 436–444; 370/331
See application file for complete search history.

(56) References Cited

U.S. PATENT DOCUMENTS

| 8,000,706 B2* | 8/2011 | Lee et al. ................... 455/435.2 |
| 2009/0017820 A1 | 1/2009 | Sohn |
| 2010/0035575 A1* | 2/2010 | Wu ............................ 455/404.1 |
| 2011/0177820 A1* | 7/2011 | Westroos et al. ............. 455/438 |

OTHER PUBLICATIONS

3GPP TR 36.814 V0.4.1 3rd Generation Partnership Project; Technical Specification Group Radio Access Network; Further Advancements for E-UTRA Physical Layer Aspects (Release 9), Feb. 2009.
3GPP TS 36.331 V8.5.0 3rd Generation Partnership Project; Technical Specification Group Radio Access Network; Evolved Universal Terrestrial Radio Access (E-UTRA) Radio Resource Control (RRC); Protocol specification (Release 8), Mar. 2009.

(Continued)

*Primary Examiner* — Charles Shedrick
(74) *Attorney, Agent, or Firm* — Winston Hsu; Scott Margo

(57) ABSTRACT

A method of handling system information reception for a mobile device having a plurality of connections to a plurality of cells in a wireless communication system comprising a network, the method comprises receiving a radio resource control (RRC) message indicating that one of the plurality of cells is a serving cell from the network, determining the cell indicated by the RRC message as the serving cell of the mobile device, and applying system information of the serving cell.

10 Claims, 3 Drawing Sheets

(56) References Cited

OTHER PUBLICATIONS

Qualcomm Europe: "Notion of Anchor Carrier in LTE-A", 3GPP TSG RAN WG1 #56, R1-090860, Feb. 9-13, 2009, pp. 1/5-5/5, XP050318710, Athens, Greece.

LG Electronics: "UE-specific Carrier Assignment for LTE-Advanced", 3GPP TSG RAN WG1 Meeting #56bis, R1-091207, Mar. 23-27, 2009, XP050338822, Seoul, Korea.

Panasonic: "LTE-advanced discussion for RAN2", 3GPP TSG RAN WG2 #65bis, R2-092394, Mar. 23-27, 2009, XP050340115, Seoul, Korea.

Sharp: "CoMP configuration for multiple component carriers in LTE-A", 3GPP TSG RAN WG1 Meeting #56bis, R1-091134, Mar. 23-27, 2009, pp. 1/2-2/2, XP050338758, Seoul, Korea.

* cited by examiner

METHOD OF HANDLING SYSTEM INFORMATION RECEPTION AND RELATED COMMUNICATION DEVICE

CROSS REFERENCE TO RELATED APPLICATIONS

This application is a divisional application of U.S. application Ser. No. 12/730,244, filed on Mar. 24, 2010 and entitled "Method of Handling System Information Reception and Related Communication Device", which claims the benefit of U.S. Provisional Application No. 61/165,524, filed on Apr. 1, 2009 and entitled "Method for Handling System Information Reception in Multiple Connections in a Wireless Communication System", the contents of which are incorporated herein in their entirety.

BACKGROUND OF THE INVENTION

1. Field of the Invention

The application relates to a method utilized in a wireless communication and a communication device thereof, and more particularly, to a method of handling system information reception in a wireless communication system and a related communication device.

2. Description of the Prior Art

Long Term Evolution wireless communication system (LTE system), an advanced high-speed wireless communication system established upon the 3G mobile telecommunication system, supports only packet-switched transmission, and tends to implement both Medium Access Control (MAC) layer and Radio Link Control (RLC) layer in one single communication site, so that the system structure becomes simple.

In the LTE system, a user equipment (UE) applies a system information acquisition procedure to acquire system information broadcasted by an Evolved Universal Terrestrial Radio Access Network (E-UTRAN) upon selecting and upon re-selecting a cell, after handover completion, after entering the E-UTRAN from another radio access technology (RAT), upon receiving an indication about the presence of an Earthquake and Tsunami Warning System (ETWS) notification, etc. The system information includes most essential and most frequently transmitted parameters that are needed to acquire other information of a cell for connection establishment.

Toward advanced high-speed wireless communication system, such as transmitting data in a higher peak data rate, LTE-Advanced is standardized by the 3rd Generation Partnership Project (3 GPP) as an enhancement of LTE system. LTE-Advanced targets faster switching between power states, improves performance at the cell edge, and includes subjects, such as bandwidth extension, coordinated multi-point transmission/reception (COMP), uplink multiple input multiple output (MIMO), etc.

For bandwidth extension, carrier aggregation is introduced to the LTE-Advanced for extension to wider bandwidth, where two or more component carriers are aggregated, for supporting wider transmission bandwidths (for example up to 100 MHz) and for spectrum aggregation. According to carrier aggregation capability, multiple component carriers are aggregated into overall wider bandwidth, where the UE can establish multiple links corresponding to the multiple component carriers for simultaneously receiving and/or transmitting.

In addition, COMP is considered for LTE-Advanced as a tool to improve coverage of high data rates, cell edge throughput, and system efficiency, which implies dynamic coordination among multiple geographically separated points. That is, when an UE is in a cell-edge region, the UE is able to receive signal from multiple cells, and the multiple cells can receive transmission of the UE.

However, in the LTE system, the system information acquisition is defined for the UE having only one connection to a single cell with a single component carrier. For the UE operated in the LTE-A system, there is no system information acquisition mechanism defined for the UE to acquire system information of additional cells for establishing at least a connection to the additional cells. Therefore, the UE has difficulty in establishing new connections with new cells since the LTE-Advanced system does not specify how the system information acquisition is applied for the UE capable of multiple connections to multiple cells with the same component carrier or different component carriers. Moreover, usage of the system information of the multiple cells is never concerned. Improper usage of the system information of the multiple cells may cause cell configuration problems.

SUMMARY OF THE INVENTION

The application discloses a method of handling system information reception in a wireless communication system and a related communication device in order to solve the abovementioned problems.

A method of handling system information reception is disclosed for a mobile device having a plurality of connections to a plurality of cells in a wireless communication system comprising a network. The method comprises receiving a radio resource control (RRC) message indicating that one of the plurality of cells is a serving cell from the network, determining the cell indicated by the RRC message as the serving cell of the mobile device, and applying system information of the serving cell.

A communication device of a wireless communication system comprising a network for handling system information reception is disclosed. The communication device having a plurality of connections to a plurality of cells comprises means for receiving a radio resource control (RRC) message indicating that one of the plurality of cells is a serving cell from the network, means for determining the cell indicated by the RRC message as the serving cell of the mobile device, and means for applying system information of the serving cell.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
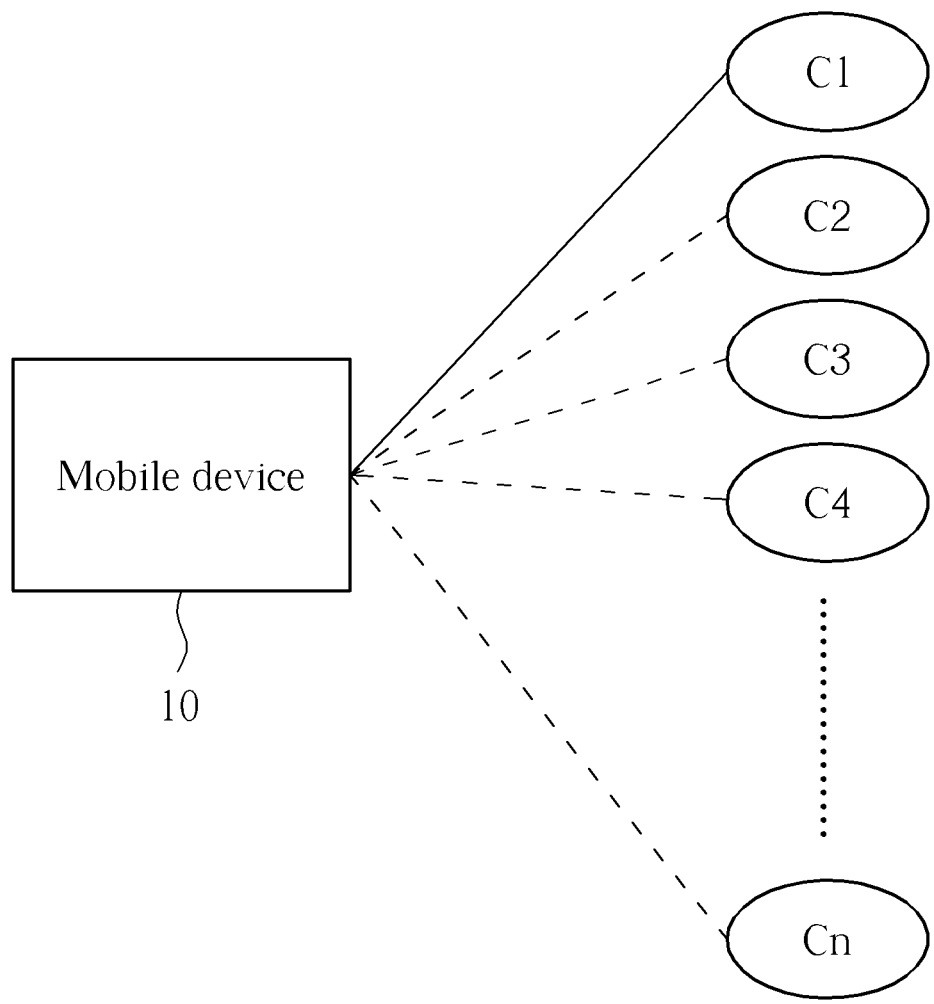
FIG. 1 is a schematic diagram of a wireless communication system.

Please refer to FIG. 1, which illustrates a schematic diagram of connections between a mobile device 10 and cells C1-Cn. In FIG. 1, the mobile device 10 is served by the cell C1, and has a connection to the cell C1. The cell C1 can send a radio resource control (RRC) message to the mobile device 10 for connection establishment with any of the cells C2-Cn.

The connection with the cell C1 and a connection with any of the cells C2-Cn can be in the same or different component carriers configured in the UE, and each of the cells C1-Cn supports a LTE radio access technology (RAT) or an E-UTRAN (Evolved Universal Terrestrial Radio Access Network) RAT. In addition, the mobile device 10 is referred as a user equipment (UE) or a mobile station (MS), and can be a device such as a mobile phone, a computer system, etc.

Figure 2:
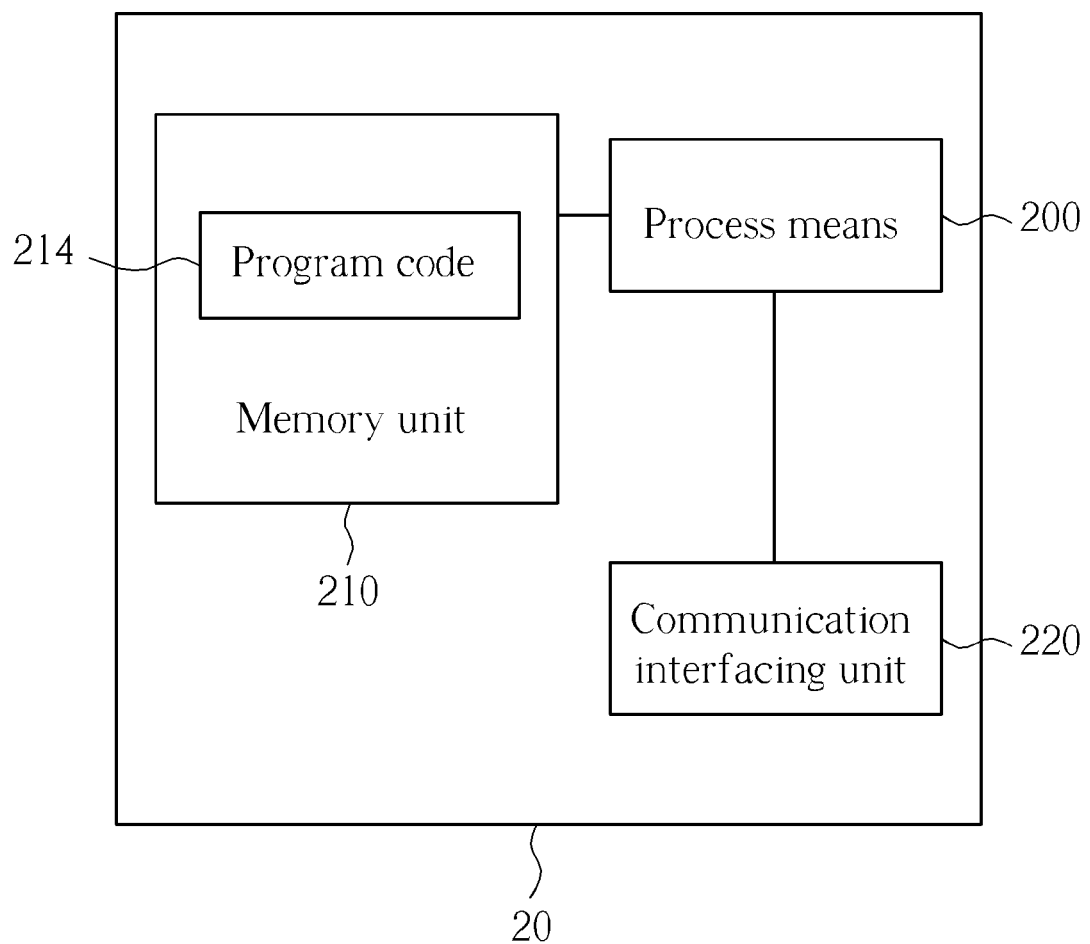
FIG. 2 is a schematic diagram of an exemplary communication device according to an embodiment.

FIG. 2 illustrates a schematic diagram of a communication device 20 according to an example. The communication device 20 can be the mobile device 10 shown in FIG. 1 and may include a processor means 200 such as a microprocessor or ASIC, a memory unit 210 and a communication interfacing unit 220. The memory unit 210 may be any data storage device that can store program code 214, for access by the processing means 200. Examples of the memory unit 210 include but are not limited to a subscriber identity module (SIM), read-only memory (ROM), random-access memory (RAM), CD-ROMs, magnetic tapes, hard disks, and optical data storage devices. The communication interfacing unit 220 is preferably a radio transceiver and can exchange wireless signals with the network according to processing results of the processing means 200.

The program code 214 includes a program code of a RRC layer which can establish connections to the cells C1-Cn respectively. The RRC layer is used for performing RRC connection establishment, re-establishment, reconfiguration, or other RRC procedures, and is responsible for generating or releasing radio bearers (RBs) including data RBs (DRBs) and signaling RBs (SRBs). Through use of the SRBs, the RRC layer and the cells C1-Cn can exchange RRC messages for radio resource settings.

Figure 3:
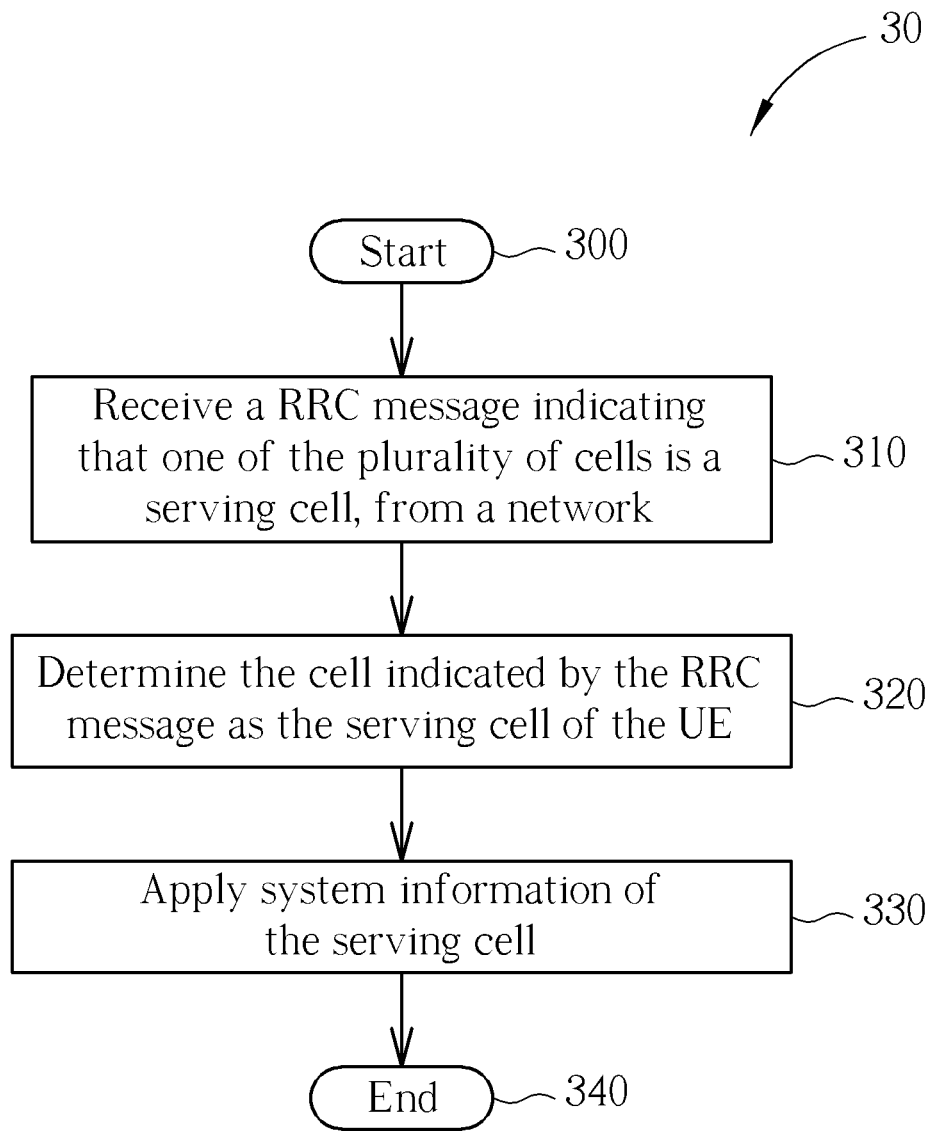
FIG. 3 is a flowchart of an exemplary process according to an embodiment.

In order to clearly understand the concept of the present application, please refer to FIG. 3, which illustrates a flowchart of a process 30 according to an example of the present application. The process 30 is utilized in the UE having a plurality of connections to a plurality of cells for handling system information reception. The process 30 can be compiled into the program code 214 and includes the following steps:

Step 300: Start.
Step 310: Receive a RRC message indicating that one of the plurality of cells is a serving cell, from a network.
Step 320: Determine the cell indicated by the RRC message as the serving cell of the UE.
Step 330: Apply system information of the serving cell.
Step 340: End.

According to the process 30, the UE determines one of the plurality of cells as the serving cell based on the RRC message, and then applies the system information of the serving cell. The system information may include non cell specific information and cell specific information. The cell specific information may be used for connection control or measurement, and includes information of cell identity, barred cell, radio resource configuration, frequency, etc. The non cell specific information may be used for cell configuration, and includes at least one of an Earthquake and Tsunami Warning System (ETWS) message, geographical information, and a value of a timer T311 related to the RRC connection re-establishment. The geographical information included in the non cell specific information may be a Public Land Mobile Network (PLMN) identity list or a tracking area code, The UE applies the PLMN identity or tracking area code means that the UE performs a tracking area update procedure when PLMN identity or tracking area code is changed.

More specifically, when the UE acquires the system information of the plurality of cells, the UE applies the non cell specific information of the acquired system information of the serving cell only, and applies the cell specific information of the acquired system information of the plurality of cells including the serving cell. As abovementioned, the cell specific information may include the cell identity, barred cell, radio resource configuration, frequency, etc, and the non cell specific information may include the ETWS message, geographical information, and timer T311 value.

Referring back to FIG. 1, let's take an example based on the process 40. The UE has established the plurality of connections to the plurality of cells (e.g. the cells C1-Cn). When the UE receives, from the network, the RRC message indicating that one of the cells C1-Cn is the serving cell (e.g. the cell C2), the UE determines the cell C2 as the serving cell, and applies the system information of the cell C2. As abovementioned, the UE applies the non cell specific information of the system information of the cell C2, and applies the cell specific information of the system information of the cells C1-Cn. With such manner, when the UE acquires the system information of the cells C1-Cn, the UE can clearly know which system information of the acquired system information of the cells C1-Cn should be used. For example, the timer T311 values in the acquired system information of the cells C1-Cn are different. Under this situation, the UE use a value of the timer T311 in the acquired system information of the cell C2 for the RRC connection re-establishment, but does not use a random value of the timers T311 from the acquired system information of the cell C1 and C3-Cn. That is, the UE only uses the timer T311 value in the acquired system information of the serving cell. Therefore, usage of the acquired system information of the cells C1-Cn is clearly specified.

Base on the concept of the process 30, the UE applies the system information of the serving cell assigned by the network through the RRC message, thereby avoiding improper usage of the system information of the plurality of cells.

Please note that, the abovementioned steps of the processes including suggested steps can be realized by means that could be hardware, firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include system on chip (SOC), system in package (Sip), computer on module (COM), and the communication device 20.

In conclusion, the abovementioned examples provide ways of acquiring and applying system information of multiple cells, and preventing improper usage of the system information of the cells.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling system information reception for a mobile device having a plurality of connections to a plurality of cells in a wireless communication system comprising a network, the method comprising:
   receiving a radio resource control (RRC) message indicating that one of the plurality of cells is a serving cell from the network;
   determining the cell indicated by the RRC message as the serving cell of the mobile device; and
   applying non cell specific information of system information of only the serving cell, wherein the non cell specific information includes at least one of an Earthquake and Tsunami Warning System (ETWS) message, geographical information, and a value of a timer T311 related to the RRC connection re-establishment.

2. The method of claim 1, wherein the system information further includes cell specific information for cell connection or measurement related to the plurality of cells.

3. The method of claim 2, wherein the geographical information comprises at least one of a Public Land Mobile Network (PLMN) identity list and a tracking area code.

4. The method of claim 1 further comprising acquiring system information of at least one of the plurality of cells.

5. The method of claim 1 further comprising acquiring system information of the serving cell.

6. A communication device of a wireless communication system comprising a network for handling system information reception, the communication device having a plurality of connections to a plurality of cells and comprising:
   means for receiving a radio resource control (RRC) message indicating that one of the plurality of cells is a serving cell from the network;
   means for determining the cell indicated by the RRC message as the serving cell of the mobile device; and
   means for applying non cell specific information of system information of only the serving cell, wherein the non cell specific information includes at least one of an Earthquake and Tsunami Warning System (ETWS) message, geographical information, and a value of a timer T311 related to the RRC connection re-establishment.

7. The communication device of claim 6, wherein the system information further includes cell specific information for cell connection or measurement related to the plurality of cells.

8. The communication device of claim 7, wherein the geographical information comprises at least one of a Public Land Mobile Network (PLMN) identity list and a tracking area code.

9. The communication device of claim 6 further comprising:
   means for acquiring system information of at least one of the plurality of cells.

10. The communication device of claim 6 further comprising:
   means for acquiring system information of the serving cell.

* * * * *